Oct. 10, 1950     W. J. BROWN     2,524,759
PHASE SHIFT NETWORK
Filed Aug. 28, 1947     2 Sheets-Sheet 1

INVENTOR.
Walter J. Brown
BY Woodling and Krost
attys

Oct. 10, 1950 W. J. BROWN 2,524,759
PHASE SHIFT NETWORK
Filed Aug. 28, 1947 2 Sheets-Sheet 2
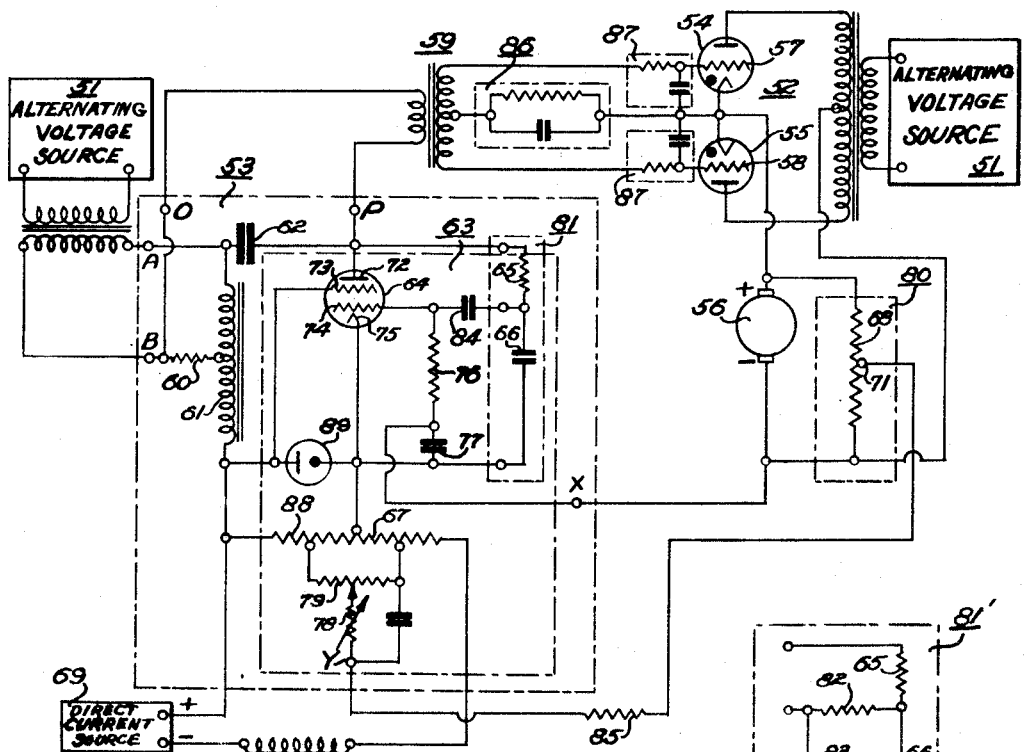
Fig. 9
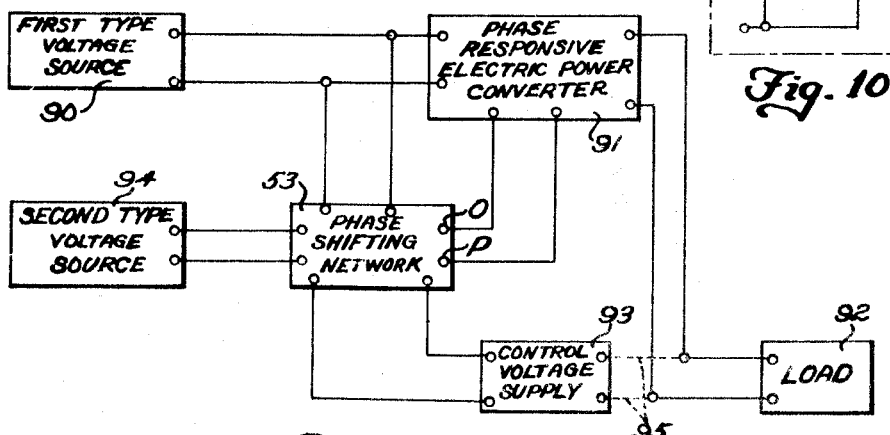
Fig. 10
Fig. 8
INVENTOR.
Walter J. Brown
BY
Shoolling and Kroat
attys Patented Oct. 10, 1950

2,524,759

UNITED STATES PATENT OFFICE 2,524,759

PHASE SHIFT NETWORK

Walter J. Brown, Cleveland Heights, Ohio

Application August 28, 1947, Serial No. 770,966

22 Claims. (Cl. 323—122)

My invention pertains in general to phase shifting networks, and more particularly to sensitive phase shifting networks that are capable of shifting the phase of the output voltage more than 180 degrees relative to the input voltage while maintaining a substantially constant magnitude of the output voltage.

Reference may be had to my copending applications entitled "Phase Shift System," "Phase Shift Bridge," and "Phase Shift Circuit," Serial Nos. 770,968, 770,967, and 779,909. This application is a parent application of my continuation-in-part application, Serial No. 172,647, entitled "Motor Control Circuit," filed July 8, 1950.

An object of my invention is a phase shifting network including a first and second reactive branch serially connected and excited by a reference voltage in which the output voltage of the network will vary in phase but not in magnitude relative to the reference voltage when the reactance of the first reactive branch is varied while maintaining a substantially constant Q therein.

Another object of my invention is a phase shifting network having a capacitance and an inductance relatively variable to establish a substantially circular arcuate locus of more than 180 degrees spanning a reference vector and other circuit means for establishing a point potential substantially in the center of said circular locus, the output of said network being represented by a radius of said circular locus.

Another object of my invention is the provision of a phase shifting network as applied to an electrical motor operable from a rectified alternating voltage source, wherein the phase shifting network is responsive to electrical changes in the motor operation and consequently shifts the phase of the grid of the rectifier tubes in accordance thereto.

Another object of my invention is the combination of an electric motor operable from space discharge rectifiers and a phase shifting network of high sensitivity capable of shifting the phase of the grid of these space discharge rectifiers more than 180 degrees relative to the energizing voltage of the phase shifting network, and which retains its high sensitivity over a full 180 degrees phase shift.

Another object of my invention is a sensitive phase shifting network for use with a phase responsive electric power converter which network is controlled by the same type voltage as utilized in the load of the converter.

Other objects and a fuller understanding of my invention may be had by referring to the following description and claims, taken in conjunction with the accompanying drawing, in which:

Figure 8 is a block diagram of an electrical system utilizing my phase shifting network for control of a phase responsive electric power converter;

Figure 9 is a circuit diagram of a motor control circuit having a phase shifting network with a quadrature feedback circuit therein and embodying the principles of my invention; and Figure 10 is a circuit diagram of an alternative arrangement of a quadrature feedback circuit as used in the circuit of Figure 9.

Figure 1:
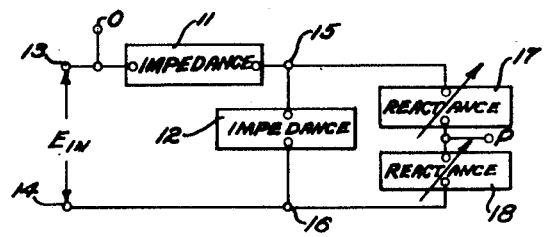
Figure 1 is a circuit diagram of a phase shifting network embodying my invention.
Figure 2:
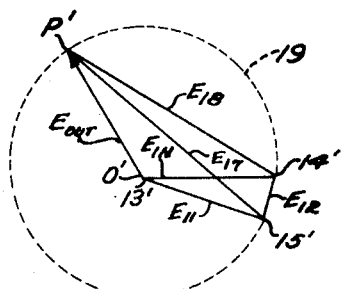
Figure 2 is a voltage vector diagram depicting the voltage vectors obtained from the circuit of Figure 1.
Figure 3:
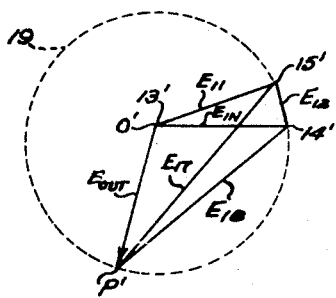
Figure 3 is a voltage vector diagram depicting other possible voltage vectors obtainable from the circuit of Figure 1.

My invention embodies various networks for obtaining a wide angle shift that is sensitive and yet maintains a reasonably constant magnitude of output voltage. The Figure 1 illustrates a basic circuit design for obtaining the vector diagrams of Figures 2 and 3, which vector diagrams show a circular locus for the output terminal P and a point locus or potential-at-a-point for the output terminal O. The output terminal O is located by circuit means close to the center of the circular locus, so that the output voltage is the radius of the circular locus, and can be varied up to nearly 360 degrees. Figure 1 shows a first impedance 11 connected in series to a second impedance 12 with these serially connected impedances connected across an alternating voltage source. Terminals 13 and 14 are provided at the ends of the serially connected impedances for connection to such an alternating voltage source. The impedance 12 has a first terminal 15 and a second terminal 16, with one end of the impedance 11 connected to the first terminal 15. A first reactance or reactive element 17 and a second reactance or reactive element 18 are serially connected across the impedance 12 at the terminals 15 and 16 thereof. A first output terminal O is connected at the first input terminal 13, and a second output terminal P is connected at the juncture of the reactances 17 and 18. The reactances 17 and 18 have been shown as being variable, although it is to be understood that either one or both may be variable, as long as the relative reactance may be varied. In this embodiment of my invention, the impedances 11 and 12 have been selected to produce voltages substantially at quadrature, and the reactances 17 and 18 are of opposite sign. The voltage vector diagram of Figure 2 may now be referred to, to explain the operation of the Figure 1. The first impedance 11 and the second impedance 12 may be respectively a condenser or capacitive element and a resistance or resistive element, or they may be a resistance or resistive element and an inductance or inductive element, which combinations will produce voltages substantially at quadrature. With either of these combinations, the first reactance 17 may be chosen as an inductance with the second reactance 18 thereby becoming a capacitance. With either of these two combinations, the vector diagram of Figure 2 will be correct. The vector 13' to 14' which is labelled $E_{in}$, will be the input voltage, with $E_{11}$ and $E_{12}$ as the voltage vectors across the impedances 11 and 12, respectively. The vectors representing the voltages across the reactances 17 and 18 are those vectors labelled $E_{17}$ and $E_{18}$, respectively, which vectors are bridging the vector $E_{12}$, the voltage across the impedance 12, which may be considered a reference, or baseline, vector. The point P' on the vector diagram describes an arcuate locus 19 spanning the vector $E_{12}$. The point O' represents the potential at the first output terminal O. The output voltage of the phase shifting network is the voltage obtained between the first and second output terminals O and P, and is represented on the vector diagram as $E_{out}$. The reactances 17 and 18 have been represented as being variable and either one or both may be variable as previously stated to vary the relative reactance therebetween. As the relative reactance of the reactances 17 and 18 is varied, the relative length of the vectors $E_{17}$ and $E_{18}$ vary to swing the point P' on the vector diagram about the arcuate locus 19. This arcuate locus 19 will be of circular form if the angle 15'—P'—14' remains constant, which angle will remain constant if the Q or power factor of the reactances remains constant as the relative reactance is varied. The Q or the power factor of the reactances may be made substantially constant by careful design, or may approach it as closely as desired. Methods of keeping the Q substantially constant are known to those skilled in the art, and one such method is to employ a thermionic reactance tube as the variable reactance. The preferred form of reactance tube comprises a pentode having a very high internal plate resistance such that the plate current is substantially independent of plate voltage. The pentode is operated at constant screen voltage, and an alternating current feedback circuit is provided from plate to grid so as to establish an alternating current grid-cathode voltage which is substantially in quadrature with an alternating current plate-cathode voltage, and which is superimposed on a direct current negative grid-biasing voltage. The alternating current plate current is in phase with the alternating current grid-cathode voltage and is accordingly substantially in quadrature with the alternating current anode-cathode voltage. Accordingly, the tube exhibits the properties of a reactance having a Q which is dependent upon how nearly the phase angle of the alternating current feedback circuit approximates 90 degrees.

The magnitude of the reactance is varied by varying the mutual conductance of the tube by altering either the direct current negative grid bias or the direct current screen voltage. The phase angle of the reactance remains constant since it is equivalent to the phase angle of the alternating current feedback circuit which is not varied. The point O' is located as closely as desired to the center of the arcuate locus 19. If the triangle 13'—14'—15' is an isosceles triangle, the point O' will be at the center of this arcuate locus 19. Theoretically, with the impedances 11 and 12 producing voltages exactly at quadrature, the angle 13'—15'—14' would be a right angle, and therefore the point O' would be below the center of the arcuate locus 19. In actual practice, both capacitive and inductive reactances have inherent resistance, which make the point O' even further below the center of the arcuate locus 19. This may or may not be desirable according to the particular application desired for the phase shifting network. However, by alternative design, the point O' may be brought to the center of the circle when so desired.

There are other possible combinations of the impedances 11 and 12 to produce quadrature voltages, namely, a resistance and a condenser, or an inductance and a resistance, respectively. With either of these two combinations, the reactances 17 and 18 would then become a capacitance and an inductance, respectively. For either of these two combinations, the vector diagram of Figure 3 would represent the vectors produced therein. The input voltage $E_{in}$ would again be represented by the vector between the points 13' and 14', with the vectors $E_{11}$ and $E_{12}$ again producing voltages substantially at quadrature, but this time these two vectors would be above the horizontal vector $E_{in}$ rather than below it. Vectors $E_{17}$ and $E_{18}$ again represent the voltages across the reactances 17 and 18, respectively, and determine the point P', which is the voltage at the output terminal P. The arcuate locus 19 which is established by the point P' again spans the vector $E_{12}$.

Figure 4:
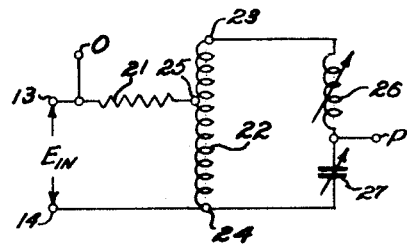
Figure 4 is a modification of my phase shifting network of Figure 1.

Figure 4 is a circuit diagram of a modification of my invention, wherein the phase shifting network is again connected to an alternating voltage source at the terminals 13 and 14. A resistive element 21 and an inductive element 22 are used to establish voltages that are not necessarily at quadrature, because of the inherent resistance of the inductive element 22. The inductive element 22 has a first and a second end terminal 23 and 24, respectively, and a mid-tap or an intermediate tap 25. The word "mid-tap" shall be construed to mean any tap intermediate the end terminals 23 and 24. One end of the resistive element 21 is connected to the input terminal 13, the other end of the resistive element 21 being connected to the mid-tap 25 of the inductive element 22. One end terminal 24 of the inductive element 22 is connected to the second input terminal 14. This arrangement means that the resistive element 21 and the portion of the inductive element 22 that lies between the terminals 24 and the mid-tap 25 are serially connected across the input terminals 13 and 14. Because of the inductive effect, a voltage is established across the terminals 23 and 24, which voltage will be greater than that voltage drop across the section of the inductive element 22 that lies between the terminal 24 and the mid-tap 25. An inductance or inductive element 26 and a capacitance or capacitive element 27 are serially connected across the end terminals 23 and 24 of the inductive element 22. The output terminal P is connected at the juncture of the inductance 26 and the capacitance 27, and the output terminal O is connected to the first input terminal 13.

Figure 5:
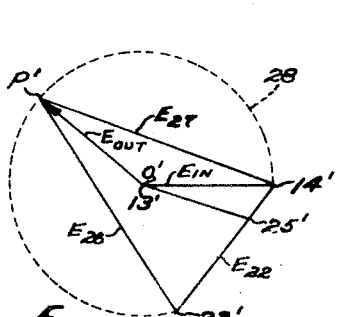
Figure 5 is a voltage vector diagram depicting the voltage vectors obtained from the circuit shown in Figure 4.

The vector diagram of Figure 5 may be referred to to explain the operation of the circuit of Figure 4. The mid-tap 25 of the inductive element 22 has been selected to place the point 13' or O' at the center of the arcuate locus 28. The description of this voltage vector diagram is similar in substance to the explanation given for the Figures 2 and 3, and 13' will be at the center of the arcuate locus 28 if the triangle 13'—14'—23' is an isosceles triangle having 14'—23' as a base.

Figure 6:
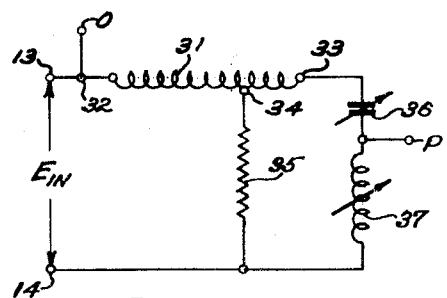
Figure 6 is a still further modification of my phase shifting network of Figure 1.
Figure 7:
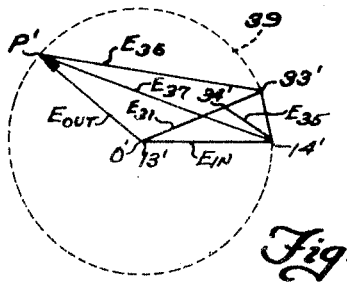
Figure 7 is the voltage vector diagram depicting the voltage vectors obtained from the circuit shown in Figure 6.

Figure 6 is another modification of my invention, wherein an inductance or inductive element 31 has a first and second terminal 32 and 33, respectively, with a mid-tap 34. A resistance or resistive element 35 has one end connected to the mid-tap 34, and the other end connected to the input terminal 14. A condenser or capacitive element 36 and an inductance or inductive element 37 are serially connected across the terminals 33 and 14, with the output terminal P connected at the juncture of the condenser 36 and the inductance 37. The output terminal O is connected at the first input terminal 13. The vector diagram of Figure 7 depicts the vectors obtained in the circuits of Figure 6, wherein the system of vector notation is the same as that followed in the other vector diagrams. The design of this circuit of Figure 6 takes into account the fact that the inductance 31 is not perfect, that is, does not have an infinite Q, and use has been made of the inherent resistance in this inductance 31. The power factor of the inductance 31 is a function of the angle 13'—34'—14', and therefore by judicious selection of the location of the mid-tap 34 or Q of the inductance 31, the point O' can be located at the center of the arcuate locus 39 that the point P' describes as the reactances are varied.

Figure 8 illustrates in block form the adaptation of my phase shifting network to an electrical system that converts a first type of voltage into a second type of voltage for utilization in a load. A first type voltage source 90 supplies a first type voltage to a phase responsive electric power converter 91 and to the phase shifting network 53. The phase responsive electric power converter 91 converts the first type of voltage of the first type voltage source 90 into a second type of voltage for utilization in the load 92. A control voltage supply obtains or generates a second type of voltage from, or in accordance with the operating conditions of, the load 92, for controlling the phase shifting network 53. A second type voltage source 94 supplies a second type voltage for the phase shifting network 53. The first and second types of voltages may be an alternating current voltage and a direct current voltage, or vice versa. One or the other of the first and the second type voltage sources will be an alternating or periodic voltage source, and the phase shifting network 53 is capable of shifting the output voltage across the terminals O and P thereof relative to a reference voltage of this alternating voltage source. In operation, the electrical system as depicted in the Figure 8 may be applied in analogy to a frequency modulated radio transmitter, where the first type voltage source 90 supplies a direct current voltage to both the phase shifting network 53, which would be the phase modulator, and to the phase responsive electric power converter 91, which would be the frequency multiplier and/or amplifier circuit of the rest of the frequency modulated radio transmitter. The phase responsive electric power converter 91 would supply an alternating voltage in the form of a frequency modulated carrier wave to the load 92, which would be an antenna or other similar load. The control voltage supply would be an alternating voltage in the form of modulation energy, and as represented by the dotted lines 95 would be in accordance with the modulation requirement needed by the load, to supply modulation voltage to the phase shifting network 53. It will be seen that the control voltage is of the second type of voltage, namely, an alternating voltage. The second type voltage source 94 would be the carrier wave input energy which the modulation voltage of the control voltage source 93 modulates.

It will be seen that the electrical system of the Figure 8, as pertaining to a frequency modulated radio transmitter, converts direct current or constant voltage power into an alternating voltage power for utilization in the load.

The electrical system of Figure 8 may also be used to depict the circuit operation of a motor control circuit wherein a direct current motor is operated from a rectified alternating voltage source. In this analogy, the first type voltage source 90 would be an alternating voltage source supplying both the phase shifting network 53 and the phase responsive electric power converter 91, which would be a rectifier device. The phase responsive electric power converter 91, or rectifier device, supplies rectified alternating voltages to a load 92 which would be a direct current motor, or other load utilizing a direct current voltage. The control voltage supply 93 would utilize the second type voltage obtained from, or in accordance with, the load 92, to change the operating conditions of the phase shifting network 53, in order that the phase shifting network may control the phase responsive electric power converter 91. The second type voltage source 94 would be a direct current voltage source supplying operating voltages to the phase shifting network 53. The direct current voltage obtained from the rectifier device 91 would be controlled in accordance with the operating conditions of the load or motor 92 through the medium of the control voltage supply 93 and the phase shifting network 53. This could be accomplished by having a reactance tube in the phase shifting network which is controlled by the direct current voltage of the control voltage supply 93 to vary the bias of this reactance tube, and consequently its effective reactance or impedance. This varying impedance of the reactance tube in the phase shifting network 53 can be made to vary the operating conditions of the phase shifting network 53, and consequently the phase of the output voltage across the terminals O and P relative to the phase of the alternating voltage obtained from the first type voltage source 90.

The Figure 9 illustrates an application of my phase shifting network as applied to a motor control circuit or other device requiring a rectified alternating voltage input. An alternating voltage source 51 supplies voltage to a rectifier device 52 and to a phase shifting network 53. The rectifier device 52 supplies rectified alternating voltage to a load or motor 56. A control voltage supply 80, which is responsive to operating conditions of the load or motor 56, is connected to the phase shifting network 53 for controlling same. A direct current source 69 supplies a constant direct voltage to the phase shifting network 53, which in turn supplies a voltage variable in phase relative to the alternating voltage source 51 for controlling the rectifier device 52. The rectifier device 52 has space discharge devices for rectification, which for purposes of illustration, but not limitation, have been shown as rectifier tubes 54 and 55, to supply full wave rectified currents to the load which is illustrated as a direct current motor 56. The space discharge devices or rectifier tubes 54 and 55 have some form of control means, illustrated by grids 57 and 58, respectively, connected to a grid transformer 59. The phase shifting network 53 has first and second input terminals A and B, respectively, connected across the alternating voltage source 51, and first and second output terminals O and P respectively, supplying the grid transformer 59. The phase shifting network 53 includes a resistance 60, an inductive winding 61, a capacitance 62, and a variable inductance 63. The resistance 60 and a portion of the inductive winding 61 are connected across the input terminals A and B, and the capacitance 62 and variable inductance 63 are serially connected across the inductive winding 61 with the second output terminal P connected therebetween. The first output terminal O is connected to the second input terminal B. The variable inductance 63 includes a thermionic tube 64, a quadrature feedback circuit 81 to make the tube 64 act as an inductance, a plate and screen voltage divider 88, a voltage regulator 89, and a biasing means 67. The tube 64 has an anode 72, a screen grid 73, a control grid 74 and a cathode 75.

The control voltage supply 80 has a shunt resistance 68 across the motor 56 with a tap 71 thereon. The phase shifting network 53 has first and second control terminals X and Y connected to the control voltage supply 80, with the first control terminal X being connected to the junction of the negative terminal of the motor 56 and one end of the shunt resistance 68, and the second control terminal Y being connected to the tap 71 on the shunt resistance 68 through a filter resistor 85. Within the phase shifting network 53, the first control terminal X is connected to the control grid 74 through a resistance 76, and to the cathode 75 through a condenser 77. The second control terminal Y is connected to the biasing potentiometer 67 through an acceleration potentiometer 78 and a speed control potentiometer 79. The quadrature feedback circuit 81 includes a resistance 65 and a condenser 66, which retards the phase of the voltage applied to the control grid 74 so that the tube 64 will act as an inductance. A condenser 84 is connected in series with the resistance 65 in the circuit between the anode 72 and the control grid 74, in order to isolate these two elements of the tube 64 for direct current voltages. The condenser 84 and the resistance 76 tend to destroy the quadrature feedback effect of the quadrature feedback circuit 81. To counteract the advancing of phase as produced by the condenser 84 and the resistance 76, I show a modified quadrature feedback circuit 81' in Figure 10. The modified quadrature feedback circuit 81' includes the resistance 65 and the condenser 66 as before, but also includes a further resistance 82 and condenser 83 to further retard the phase, in order to obtain a feedback voltage to the control grid 74 that is as close to 90 degrees retarded as desired.

In the rectifier device 52, a self-biasing means 86 is provided to help prevent accidental firing of the tubes 54 and 55 on the negative half-cycle. Grid loading means 87 are connected in the grid cathode circuit of the tubes 54 and 55 to prevent an effectual short circuit of half of the grid transformer when the respective tube is firing.

In operation, the alternating voltage source 51 supplies an alternating voltage of fixed magnitude and phase to both the rectifier device 52 and the phase shifting network 53. The phase shifting network 53, being responsive to the control voltage supply 80, controls the rectifier device 52 by supplying a phase shifted voltage from its output terminals O and P. The voltage vector diagram of Figure 5 represents the voltage vectors obtainable from the phase shifting network 53, wherein the variable inductance 63, which is a reactance tube, varies the potential at the output terminal P about a circular locus, with the point O at the center thereof. The settings of the second speed control potentiometer 79, and the acceleration potentiometer 78 govern respectively, the ultimate speed of the motor 76, and the rate of acceleration in coming up to that speed. The biasing means 67 determines the bias at which the thermionic tube 64 operates, thereby determining its impedance, and consequently the operating point on the arcuate locus of the voltage vector diagram. When there is a high bias, the tube 64 has a high impedance, and the position of the point P' on the voltage vector diagram will be at its farthermost clockwise position. In this position, the voltage across the terminals O and P is 180 degrees out of phase with respect to the phase of the voltage of the alternating voltage source 14—13, and thereby the rectifier device 52 has no output. When there is a low bias condition of the biasing means 67, the impedance of the tube 64 is low, thereby shifting the operating point of the point P' in a counter-clockwise direction. The point P' may easily be shifted counter-clockwise to permit the output voltage across the terminals O and P to be directly in phase with the voltage of the alternating voltage 14—13, thereby allowing the rectifier device 52 to have a full output. The speed control potentiometer 79 governs the speed of the motor 56 between these two limits, and consequently is connected across only a portion of the biasing means 67 to establish these limits of control. The control voltage supply 80 obtains a voltage that is proportional to speed from the shunt resistance 68. The control terminal Y, which is connected to the shunt resistance 68, applies a negative voltage proportional to speed, which, as the speed increases, increases the bias of the tube 64 and consequently the impedance thereof, to decrease the output of the rectifier device 52, to maintain the speed constant. The control terminal X furnishes a return path for the direct current voltages obtained from the control voltage supply 80. The voltage obtained from the control voltage supply 80 will not be a pure direct current, inasmuch as the motor 56 is being supplied with pulses of current from the rectifier device 52. A filtering arrangement for the control voltage is furnished by the condenser 77 and the filter resistor 85. A further filtering action is obtained by the resistance 76 in conjunction with the condensers 84 and 66. This filtering action assures that direct current control voltages are applied to the biasing means 67.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A phase shifting network having a first and a second output terminal comprising, a circuit path including a reference arm, said circuit path being electrically connected to said first output terminal and adapted to be excited from an alternating voltage source for establishing across the said reference arm a reference voltage having a fixed magnitude and phase relationship with respect to the alternating voltage source, a capacitive arm, and an inductance arm serially connected to said capacitive arm with said second output terminal connected therebetween and with the series combination connected across said reference arm, said serially connected arms having relatively variable impedance and thereby in conjunction with said reference arm establishing between said first and second output terminals a voltage variable in phase relative to the alternating voltage source upon exciting the serially connected arms with an alternating voltage having a fixed magnitude and phase relationship relative to the alternating voltage source, such that the locus of the potential of the second output terminal lies, in a vector diagram, on an arc spanning said reference voltage vector, and the potential of said first output terminal lies, in the vector diagram, within the space bounded by the reference voltage vector and said arc.

2. In combination with an alternating voltage source, the provision of a phase shifting network having first and second output terminals, said phase shifting network including a circuit having a circuit element with one end of said element connected to said first output terminal, means for exciting said circuit element from said alternating voltage source for establishing across said circuit element a voltage having a definable magnitude and phase relationship with respect to said alternating voltage source, a capacitive arm, an inductive arm, means for serially connecting said arms with said second output terminal therebetween, means for exciting said serially connected arms with an alternating voltage having a definable magnitude and phase relationship with respect to said alternating voltage source, means for varying the relative impedance of said serially connected arms and means for maintaining a substantially constant Q in said arms as said arms are relatively varied over a desired part of a working range, whereby the voltage established between said first and second output terminals will have a substantially constant magnitude over said part of said working range.

3. A phase shifting network having first, second and third terminals including, a first circuit and a second circuit, said first and second terminals being the output terminals of said network, said first circuit including said first and third terminals, means for exciting said first circuit with an alternating voltage, input for establishing a first voltage between said first and third terminals, said first voltage having a fixed magnitude and phase relationship with respect to said alternating voltage input, said second circuit including said second and third terminals, a capacitive element, an inductive element, means for serially connecting said elements with said second terminal therebetween, means for exciting said serially connected elements with an alternating voltage having a fixed magnitude and phase relationship with respect to said alternating voltage input, means for varying the relative reactance of said elements, and means for maintaining a substantially constant Q as said elements are relatively reactively varied, whereby the voltage between said output terminals will have a substantially constant magnitude variable in phase by more than 180° with respect to said alternating voltage input.

4. A phase shifting circuit which may be vectorially represented on a voltage vector diagram by a fixed baseline vector representing a constant applied alternating voltage, an inductive and a capacitive reactance serially connected through a second output terminal and including the source of said constant applied voltage whereby voltages are established across each reactance of which the vectors form two sides of a triangle based on said fixed baseline vector, the apex of which triangle determines the potential of the second output terminal, means for varying the ratio of the said reactances while maintaining substantially constant power factor in each said reactance, whereby the apex of said triangle moves upon a substantially circular arc based on said fixed baseline vector and subtending more than 180° at its center, and a fixed network producing a potential at a first output terminal which is substantially at the center of said arc, whereby the potential difference between the first and second output terminals is vectorially represented by a straight line capable of rotating through more than 180° while remaining reasonably constant in amplitude.

5. A phase shifting network comprising, first, second, third, and fourth terminals, alternating voltage input means, said first and second terminals being the first and second output terminals, respectively, of said network, said network having circuit means between said third and fourth terminals across which a first voltage appears, circuit means between said first and third terminals across which a second voltage appears, said alternating voltage input means being applied across said first and fourth terminals as a third voltage, reactive circuit means between said second and third terminals across which a fourth voltage appears, reactive circuit means between said second and fourth terminals across which a fifth voltage appears, said first, second and third voltages establishing a first triangle on a voltage vector diagram having the first voltage as a base and with the apex of the triangle representing a vector point of voltage of said first output terminal, said first, fourth and fifth voltages establishing a second triangle on said voltage vector diagram having said first voltage as a base coinciding with the base of said first triangle and with the apex of said second triangle representing the locus of voltage of said second output terminal, said reactive circuit means being relatively variable to cause the said locus of voltage to be substantially arcuate of more than 180° about said vector point.

6. In combination with a source of periodic voltage, the provision of a phase shifting network including, a first and second output terminal having an output voltage established therebetween, an impedance element, a first reactive element serially connected to said impedance element and to said first output terminal, means for exciting said elements from said source of periodic voltage, a second reactive element, a third reactive element of a sign opposite to said second reactive element and serially connected thereto with said second output terminal connected therebetween, means for exciting said second and third reactive elements with a periodic reference voltage having a fixed magnitude and phase relationship relative to said periodic voltage source, and means for varying the relative reactance of said second and third reactive elements, such that the locus of the potential of the second output terminal lies, in a vector diagram, on an arc spanning said reference voltage vector, and the potential of said first output terminal lies, in the vector diagram, within the space bounded by the reference voltage vector and said arc, whereby said output voltage will vary in phase by more than 180° with respect to said periodic voltage source.

7. A phase shifting network having two output terminals and including a capacitive element and an inductive element at least one of which is a reactance tube serially connected with one of said output terminals therebetween, means for exciting said elements with an alternating reference voltage, a fixed network for establishing at the other output terminal a fixed potential relative to said alternating voltage, and means for varying the reactance of said at least one reactance tube to obtain a phase shifted output voltage relative to said alternating voltage, such that the locus of the potential of said one output terminal lies, in a vector diagram, on an arc spanning said reference voltage vector, and the potential of said other output terminal lies, in the vector diagram, within the space bounded by the reference voltage vector and said arc.

8. A phase shifting network having first and second output terminals comprising, a circuit having a circuit element connected to said first output terminal and adapted to be excited from an alternating voltage source for establishing across said circuit element a voltage having a definable magnitude and phase relationship with respect to said alternating voltage source, a first and a second reactive arm of opposite sign at least one of which is a reactance tube serially connected together with said second output terminal connected therebetween, means for exciting said serially connected arms with an alternating voltage having a definable magnitude and phase relationship with respect to said alternating voltage source and means for varying the impedance of said at least one arm while maintaining a substantially constant Q therein.

9. In combination with a periodic voltage source, a phase shifting network having first and second output terminals, said phase shifting network including an inductive and a capacitive reactance at least one of which comprises a reactance tube serially connected through said second output terminal, input means for injecting into said serially connected reactances a periodic reference voltage that has a definite magnitude and phase relationship with respect to said periodic voltage source, means for varying the reactance of said at least one reactance tube, and circuit means for establishing between said first output terminal and a point in said circuit means a periodic voltage having a definite magnitude and phase relationship with respect to said periodic voltage source, such that the locus of the potential of the second output terminal lies, in a vector diagram, on an arc spanning said reference voltage vector, and the potential of said first output terminal lies, in the vector diagram, within the space bounded by the reference voltage vector and said arc, whereby the output voltage obtained across said first and second output terminals may be varied in phase by more than 180°.

10. A phase shifting network having a capacitive element and an inductive element serially connected with an output terminal connected therebetween, means for energizing said elements in series with an alternating voltage, means for varying the relative reactance of said elements whereby on a voltage vector diagram such output terminal establishes a locus which lies upon an arc of more than 180° spanning the vector of said alternating voltage, and other circuit means for establishing a point potential at another output terminal of said network which is between said arcuate locus and said alternating voltage vector.

11. In combination with an alternating voltage source having first and second terminals, the provision of a phase shifting network having a third terminal, first and second impedance means capable of producing voltages substantially at quadrature and connected across said first and second terminals, first and second reactive arms of opposite sign serially connected to at least a portion of at least one of said impedance means and with said third terminal connected therebetween, said first and third terminals being the output terminals of said network, and means for varying the relative impedance of said reactive arms.

12 In combination with an alternating voltage source, the provision of a phase shifting network having a first and a second output terminal, a first impedance arm, and at least part of a second impedance arm serially connected together, means for energizing said impedance arms from said alternating voltage source, said first output terminal being at one end of said impedance arms, first and second reactive arms of opposite sign serially connected across at least a portion of at least one of said impedance arms and with said second output terminal connected therebetween, and means for varying the relative impedance of said reactive arms.

13. In combination with an alternating voltage source having first and second terminals, the provision of a phase shifting network having a third terminal, a resistive element and at least part of a first inductive element serially connected to said first and second terminals of said alternating voltage source, a second inductive element and a capacitive element serially connected to at least a portion of at least one of said resistive and first inductive elements and with said third terminal connected therebetween, said first and third terminals being the output terminals of said network, means for varying the relative reactance of said capacitive and second inductive elements.

14. In combination with an alternating voltage source having first and second terminals, the provision of a phase shifting network having a third terminal, said first and third terminals being the output terminals of said network, a first capacitance element and a resistance element serially connected across said alternating voltage source, an inductance element and a second capacitance element serially connected across said resistance element, said third terminal being connected at the juncture of said inductance element and said second capacitance element, and means for varying the relative reactance of said inductance and second capacitance elements for varying the phase of the output voltage.

15. In combination with an alternating voltage source having two terminals, the provision of a phase shifting network having two output terminals, a resistance element and a first inductance element serially connected across the two terminals of said alternating voltage source, a second inductance element and a capacitance element serially connected across said first inductance element and with one of said output terminals connected therebetween, the other output terminal of said network being one of said terminals of said alternating voltage source, and means for varying the relative reactance of said second inductance element and said capacitance element.

16. In combination with an alternating voltage source having two terminals, the provision of a phase shifting network having two output terminals, a resistance element and a first capacitance element serially connected across the two terminals of said alternating voltage source, a second capacitance element and an inductance element serially connected across the said first capacitance element and with one of said output terminals connected therebetween, the other of said output terminals being one of said terminals of said alternating voltage source and means for varying the relative reactance of said inductance and second capacitance elements.

17. In combination with an alternating voltage source having two terminals, the provision of a phase shifting network having two output terminals, a resistive element and a first capacitive element serially connected across the two terminals of said alternating voltage source, an inductive element and a second capacitive element serially connected across one of said two first named elements and with one of said output terminals connected therebetween, the other of said output terminals being one of said terminals of said alternating voltage source, and means for varying the relative reactance of said inductive and second capacitive elements while maintaining a substantially constant Q therein over a desired part of a working range.

18. In combination with an alternating voltage source having two terminals, the provision of a phase shifting network having two output terminals, a resistive element and a first inductive element serially connected across the two terminals of said alternating voltage source, a capacitive element and a second inductive element serially connected across one of said two first named elements and with one of said output terminals connected therebetween, the other of said output terminals being one of said terminals of said alternating voltage source, and means for varying the relative reactance of said capacitive and second inductive elements while maintaining a substantially constant Q therein over a desired part of a working range.

19. In combination with a periodic voltage source, the provision of a phase shift circuit having first and second output terminals, a first branch circuit including said first output terminal and energized from said periodic voltage source, a second branch circuit having serially connected first and second circuit element means with said second output terminal connected therebetween, said first circuit element means having an inductive component and said second circuit element means having a capacitive component, means for serially exciting the element means in said second branch circuit from a reference periodic voltage having a definable phase relationship with respect to said periodic voltage source, means for varying the relative impedance of said first and second circuit element means such that the locus of the potential of the second output terminal lies, in a vector diagram, on an arc spanning said reference voltage vector, which arc curls through a change of direction of more than 180 degrees, and the potential of the first output terminal lies, in the vector diagram, within the space bounded by said reference voltage vector and said arc.

20. In combination with an alternating voltage source, the provision of a phase shift circuit having first and second output terminals, a first branch circuit including said first output terminal and energized from said alternating voltage source, a second branch circuit having first and second circuit element means effectively connected in series with said second output terminal connected therebetween, said first circuit element means being predominantly inductive and said second circuit element means being predominantly capacitive, means for serially exciting the element means in said second branch circuit from a reference alternating voltage having a definable phase relationship with respect to said alternating voltage source, means for varying the relative impedance of said first and second circuit element means such that the locus of the potential of the second output terminal lies, in a vector diagram, on an arc spanning said reference voltage vector, and the potential of said first output terminal lies, in the vector diagram, within the space bounded by the reference voltage vector and said arc.

21. In combination with an alternating voltage source having first and second terminals, the provision of a phase shifting network having a third terminal, a resistive element and a first capacitive element serially connected to said first and second terminals of said alternating voltage source, an inductive element and a second capacitive element serially connected across one of said resistive and first capacitive elements and with said third terminal connected therebetween, said first and third terminals being the output terminals of said network, and means for varying the relative reactance of said inductive and second capacitive elements.

22. In combination with an alternating voltage source having two terminals, the provision of a phase shifting network having two output terminals, a resistive element and a first inductive element serially connected across the two terminals of said alternating voltage source, a capacitive element and a second inductive element serially connected across one of said two first named elements and with one of said output terminals connected therebetween, the other of said output terminals being one of said terminals of said alternating voltage source, and means for varying the relative impedance of said capacitive and second inductive elements.

WALTER J. BROWN.

REFERENCES CITED

The following references are of record in the file of this patent:

UNITED STATES PATENTS

| Number | Name | Date |
|---|---|---|
| 1,717,400 | Nyquist | June 18, 1929 |
| 1,900,538 | Bedford | Mar. 7, 1933 |
| 2,032,176 | Kavalsky | Feb. 25, 1936 |
| 2,100,467 | Borden | Nov. 30, 1937 |
| 2,125,127 | Roberts | July 26, 1938 |
| 2,229,448 | Garman | Jan. 21, 1941 |
| 2,379,614 | Tunick | July 3, 1945 |
| 2,414,475 | Marchand | Jan. 21, 1947 |